United States Patent
Sakashita et al.

[11] Patent Number: 5,519,271
[45] Date of Patent: May 21, 1996

[54] STATOR OF ROTATING ELECTRIC MACHINE

[75] Inventors: Hiroshi Sakashita; Eiji Arasaki, both of Komagane, Japan

[73] Assignee: Sankyo Seiki Mfg. Co., Ltd., Nagano, Japan

[21] Appl. No.: 140,052

[22] PCT Filed: Apr. 30, 1992

[86] PCT No.: PCT/JP92/00567

§ 371 Date: Dec. 17, 1993

§ 102(e) Date: Dec. 17, 1993

[87] PCT Pub. No.: WO92/20132

PCT Pub. Date: Nov. 12, 1992

[30] Foreign Application Priority Data

Apr. 30, 1991 [JP] Japan ................. 3-039720 U
Nov. 28, 1991 [JP] Japan ................. 3-105822 U

[51] Int. Cl.⁶ .............. H02K 11/00; H02K 3/46; H02K 1/12
[52] U.S. Cl. ................. 310/71; 310/254
[58] Field of Search ............... 310/71, 194, 254, 310/67 R, DIG. 6

[56] References Cited

U.S. PATENT DOCUMENTS

| Re. 34,001 | 7/1992 | Wrobel | 310/71 |
| 5,157,293 | 10/1992 | Escaravage | 310/71 |
| 5,173,628 | 12/1992 | Yoshida et al. | 310/71 |
| 5,268,604 | 12/1993 | Katakura | 310/71 |

FOREIGN PATENT DOCUMENTS

| 60-7680 | 1/1985 | Japan . | |
| 649481 | 1/1989 | Japan . | |
| 217973 | 2/1990 | Japan . | |
| 6-46543 | 2/1994 | Japan | 310/71 |
| 6-54475 | 2/1994 | Japan | 310/71 |

*Primary Examiner*—Clayton E. Laballe
*Attorney, Agent, or Firm*—McAulay Fisher Nissen Goldberg & Kiel

[57] ABSTRACT

An improved configuration for processing the wire end of a coil wound around each salient pole of a stator core of a rotating electric machine having a core is provided. The configuration enables the winding of the coil around the salient-pole and the coupling of the coil to the circuit substrate without using any protruding member such as a terminal or a hook to reduce the thickness of the stator and automate all the processes from the winding process to the coupling process, thereby reducing the manufacturing cost. The stator of a rotating electric machine according to the present invention comprises an insulating-type core holder assembled in the ring portion of a stator core having a plurality of radially protruding salient poles, and this stator core is provided with a holding portion for holding the winding start and final winding ends of the coil wound around each salient pole, and a coupling portion which exposes a part of the winding start or final winding end of the coil where a connection to the corresponding terminal portion is made, and which further accommodates a solder for soldering the winding start or final winding end of the coil to the corresponding terminal portion, e.g., the soldering land of the circuit substrate. Since the winding start or final winding end of the coil is held by the core holder, it can be soldered directly on the soldering land of the circuit substrate without protruding in the wire stacking direction of the coil.

8 Claims, 10 Drawing Sheets

STATOR OF ROTATING ELECTRIC MACHINE

BACKGROUND OF THE INVENTION a) Field of the Invention

The present invention relates to a stator of a rotating electric machine having a core, and more particularly to the improvement of the structure for processing end wires of coils wound around salient poles of a stator core.

b) Background Art

A coil is generally wound around each salient pole of a stator core in a rotating electric machine having a core by means of a winding machine adopting a nozzle system in which a wire is supplied through a nozzle. In such a system, since the front and rear end wires of the coil in each phase must be coupled to end wires of the coil in another phase or an external circuit, various devices are applied to process end wires of the coil in the midst of winding process using the winding machine.

For example, the stator shown in FIG. 28 comprises a stator core 41, a ring-shaped core holder 42 assembled to the ring-shaped portion provided inside the stator core 41, and a plurality of terminals 43 piercing through the core holder 42 in the direction of the thickness of the holder 42. These terminals 43 are projected from both planes of the stator core 41 and used to connect and fix the end wires of coils 44, thereby carrying out the winding process. The state in which the coils 44 are wound in the stator core 41 is called "a core coil unit". In order to install this core coil unit on a circuit substrate 45, cream solder or the like is previously applied to soldering lands 46 on a circuit substrate 45, and the terminals 43 protruding from the stator core 41 toward the circuit substrate 45 are positioned at the soldering lands 46 to enable reflow soldering.

Another example shown in FIG. 29 comprises a core holder 52 provided with a plurality of hooks 53 and assembled in the ring-shaped portion of a stator core 51, and a plurality of salient poles 59. A wire is successively twined around the hooks 53 and the salient poles 59 to form coils 55 at the respective poles 59, and crossover wire portion between any two adjacent hooks 53 is adhered to the core holder 52 to constitute the core coil unit. Before installing the core coil unit on a circuit substrate 57, crossover wire portion between the two adjacent hooks 53 is firstly soldered at a point designated by 54 to each of soldering lands 58 on the circuit substrate 57, and specific parts of the wire designated by reference numeral 56, i.e., the wire between the V phase and the W phase in the shown example is cut and removed.

The stator of a rotating electric machine shown in FIG. 28, however, has the terminals 43 protruding from the core holder 42. As a result, it increases a dimension in the direction wherein the core coil unit is stacked on the circuit substrate, which is a drawback in reducing the thickness of the rotating electric machine.

Further, in accordance with the stator of the rotating electric machine shown in FIG. 29, it is necessary to peel off the covering of the wires 56 between adjacent hooks 53 after forming the coils 55 and to solder them to the soldering lands 58. In addition, the wires 56 extend above and away from the circuit substrate 57, making impossible the reflow soldering. Automatic assembly is therefore difficult.

OBJECT AND SUMMARY OF THE INVENTION

It is therefore an object of the present invention to reduce the thickness of a rotating electric machine and the manufacturing cost thereof.

More particularly, an object of the present invention is to provide a stator of a rotating electric machine, which is capable of efficiently winding and coupling the wire without using any component member such as a terminal or a hook protruding toward the coil stacking direction of the core coil unit, and effectively mounting the core coil unit on the circuit substrate.

Further, another object of the present invention is to provide a stator of a rotating electric machine in which the processing steps from the winding process to the coupling process are reduced and which enables automatic soldering.

To achieve those purposes, a stator of a rotating electric machine according to the present invention comprises: of a rotating electric machine comprising: a stator core having a plurality of salient poles radially protruding from a ring portion thereof; a core holder having an insulating property, which is assembled into the ring portion of the stator core; and a coil wound around each of the salient poles, the core holder being formed with coil end processing portions on a plane facing oppositely towards a plane of a circuit substrate on which there is formed a land portion for mounting the core holder thereon, each of the coil processing portions- Including: a holding portion for holding a winding start end or a final winding end of the coil; and a coupling portion having a larger width than that of the holding portion, wherein the coupling portion is to expose a part of said winding start end or final winding end of the coil, with which part is to be connected the land portion associated with the circuit substrate, wherein the coupling portion is also to surround the part of said winding start or final winding end in such a manner as to form a plane facing oppositely towards said land portion of said circuit substrate, with the coil therebetween, and wherein the coupling portion further forms a recessed portion which is sufficiently large to accommodate a predetermined amount of solder previously supplied to the land portion of the circuit substrate and to permit for soldering, therewithin, the winding start and final winding ends to the land portion of the circuit substrate.

The coil end processing portion is constituted by recessed parts formed on the surface of the core holder. The holding portion is not restricted to the embodiment illustrated, and it is preferable to constitute such holding portion by a groove having a width substantially equal to the wire diameter of the coil and a depth larger than the wire diameter of the same. Similarly, the coupling portion is not restricted to the embodiment shown, but preferably, a plane of this coupling portion, which faces oppositely towards the land portions of the circuit substrate, may be defined at a plane opposite to a part of the same coupling portion which is to be soldered to the land portions of the circuit substrate. This is done in such a manner as to allow contact with the foregoing coils. In this case, that particular plane of coupling portion facing oppositely towards the land portions of the circuit substrate will prevent the upward floating or raising tendency of the coils, thus permitting the distance between the land portion and coils to be set to a given degree and avoiding a poor soldering. It is noted that the coupling portion is constituted by a recessed potion which is so dimensioned to be larger than the wire diameter of the coil. An electrically conductive plate is provided at the land portion formed on the circuit substrate which is to be connected with the end of the coil.

Further, according to the stator of the present invention, a conductive member, which is electrically connected in advance to the winding start end or final winding end of the coil, is arranged inside the coupling portion, and either of the two ends of the coil is electrically connected to a terminal portion, such as the soldering land on the circuit substrate.

Furthermore, according to the stator of the present invention, there are formed partition portions for positioning the conductive member, in the coupling portion.

In accordance with the above-constructed stator of a rotating electric machine of the present invention, the winding start and final winding ends of the coil are held and embedded in the coil end processing portion of the core holder, while the wire is wound around the respective salient poles, and the thus-obtained core coil unit is soldered within the space having a ceiling provided in the coupling portion where the winding start end or final winding end of the coil is exposed, so that electrical connection to the terminal portion is achieved. The winding and coupling process of the wire as well as the mounting process of the core coil unit are thus efficiently performed without using any protruding component member such as the prior art terminal, thereby reducing the thickness of the rotating electric machine while enhancing the productivity. In this case, it will be possible to automate the soldering through a reflow soldering process, which insures that the ends of coils are electrically connected with the land portions via the soldering, and further prevents overflow or dispersion of soldering applied to those elements into other areas than the coupling portion, e.g., the foregoing supporting portion, when the soldering is heated. Furthermore, the coil can be provided on each salient pole, with the winding start and final winding ends of the coil being fixed in the coil end processing portion, and the terminal portion can be soldered inside the coupling portion, with the winding start and final winding ends of the coil being fixed in the holding portion, respectively. Therefore, it is possible to automate the winding process as well as the coupling process in which the end of the coil is coupled to the soldering land portion and the coupled end to the terminal portion, resulting in the reduction in the production cost.

Moreover, according to the present invention, a conductive member which is connected to the winding start and final winding ends of the coil are arranged inside the coupling portion of the coil end processing portion formed on the core holder, and soldering is made to the terminal portion such as the soldering land on the circuit substrate through the conductive member, whereby the reliability of the electrical connection between the coil and the circuit substrate is increased and a secure connection is also realized. In addition, the present invention eliminates any affect of the conductive member which may lift or bend the end portion of the coil and thus, a reliable coupling of the wire can be made even when the positioning on the circuit substrate is relatively rough, which facilitates the automation of all the processes involved.

PREFERRED EMBODIMENTS OF THE PRESENT INVENTION AND BEST MODE

Best Mode for Embodying the Invention

Figure 1:
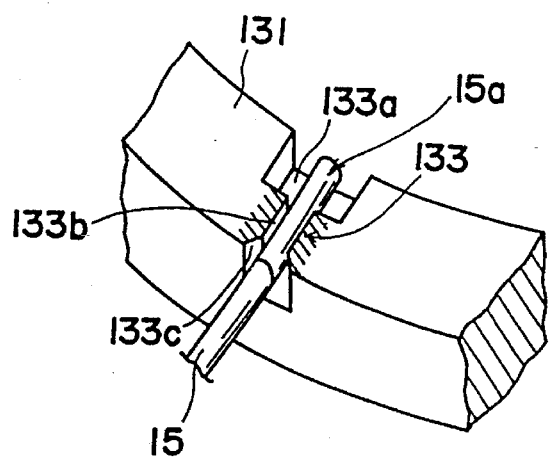
FIG. 1 is an enlarged perspective view showing the appearance of an coil end processing portion constructed in accordance with a first embodiment of the present invention.

The structure of a stator of a rotating electric machine according to the present invention will now be described hereinunder in detail with reference to the embodiments shown in the drawing.

An example in which a stator of a rotating electric machine according to the present invention is applied to a spindle motor will be first explained.

Figure 15:
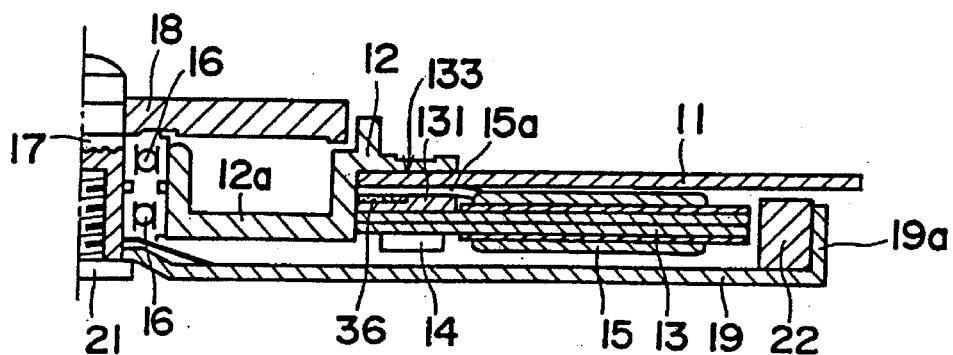
FIG. 15 is a mid-sectional view showing an example of a rotating electric machine employing the stator according to the present invention.

FIG. 15 shows an example of a spindle motor. This spindle motor comprises a stator unit and a rotor unit. The stator unit consists of a circuit substrate 11 and a stator core 13 provided with a plurality of salient poles 132 each having a coil 15 wound therearound, while the rotor unit consists of a rotor shaft 17 and a rotor cup 19 having a rotor magnet 22. The circuit substrate 11 and the stator core 13 both constituting the core coil unit are secured to a flange 12a of a bearing holder 12 by means of a small screw 14 or the like. A tap 15a (a connecting point of a coil end which is soldered to a soldering land or the like of the circuit substrate 11) of winding start end or final winding end a coil is on each phase which is wound around each salient pole 132 of the stator core 13 is embedded in a coil end processing portion 133 of a core holder 131 and soldered to each corresponding soldering land 11U, 11V, 11W or 11C of the circuit substrate 11. Reference numeral 36 represents the solder.

The bearing holder 12 supports the rotor shaft 17 via a pair of ball bearings 16. A disc type spindle hub 18 is secured to the output side (the upper side in the drawing) of the rotor shaft 17 and a rotor casing 19 is fixed to the lower side of the same 17 by using a small screw 21 or the like. A ring-shaped rotor magnet 22 is fixed to a flange 19a of the rotor casing 19 so as to be opposite to the stator core 13 with a given gap therebetween.

Figure 2:
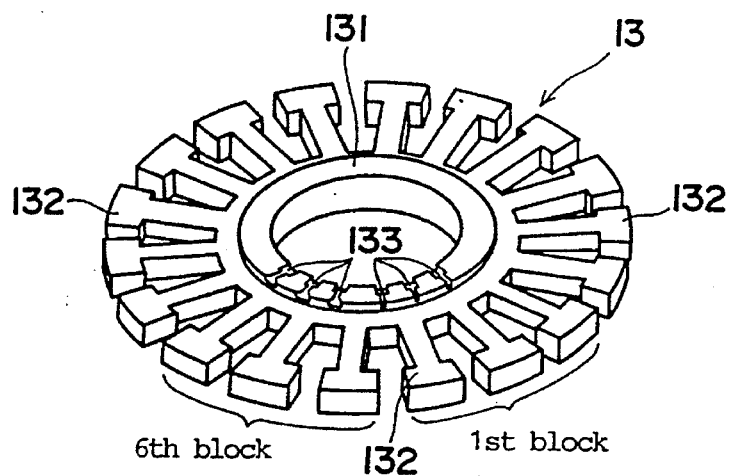
FIG. 2 is a perspective view showing a stator core constructed in accordance with the first embodiment of the present invention.
Figure 3:
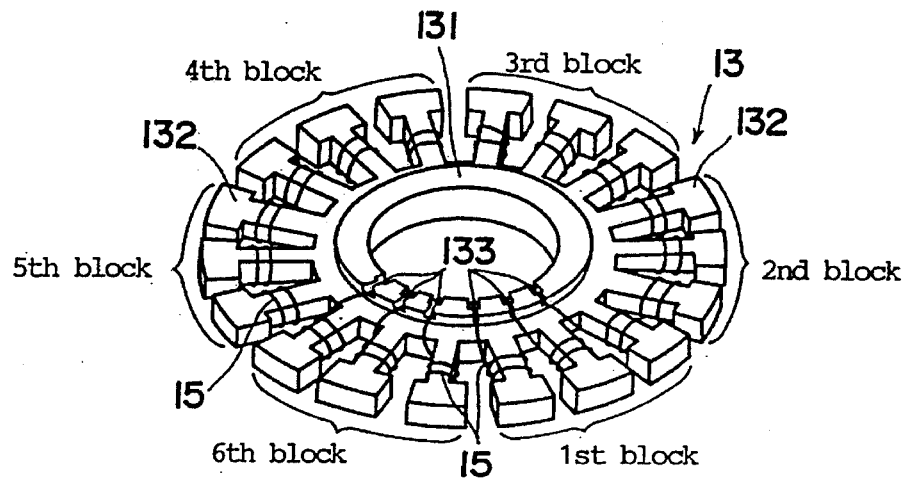
FIG. 3 is a perspective view showing a core coil unit in which the coil is wound around the stator core.

The stator core 13 is obtained by superimposing the core material one on another and then applying an insulating coating thereon. As shown in FIGS. 2 and 3, the stator core 13 has, provided at the inner hole thereof, the core holder 131 made of an insulating resin material, forming a ring-shaped member. A number of salient poles 132 (18 poles in the shown example) are radially projected from the ring portion of the stator core 13. Of the salient poles 132, the adjacent three ones constitute one block, such that the salient poles 132 are divided into first to sixth blocks, providing thus six blocks in total. The three salient poles 132 in each block have the coils 15 wound therearound in three different phases.

In the core holder 131 fixed to the inner hole of the stator core 13, coil end processing portions 133 are provided for processing the winding start or final winding end of the coil 15, such as to be disposed in correspondence with each salient pole 132 in the first and sixth blocks, as shown in FIGS. 1 to 4. The coil wire end processing portion 133 is adapted to hold and accommodate therein winding start or final winding end of the coil 15. As shown in FIG. 1, the coil end processing portion 133 may be constituted by concave portions forming: a coupling portion 133a for accommodating the solder 36 which connects the tap 15a of the coil 15 with the circuit substrate 11; a holding portion 133b for holding the winding start or final winding end of the coil 15; and an inserting portion 133c for allowing the winding start or final winding end of the coil 15 to be introduced into the holding portion 133b. The core holder 131 is not restricted to the embodiment, but may be made of a synthetic resin material having excellent heat resistance and insulation, for example, one having vitreous component dispersed therein.

The connecting portion 133a has a space which is sufficiently large to accommodate the solder 36 for connecting the tap 15a of winding start or final winding end of the coil 15 with the circuit substrate 11, and is arranged at the position corresponding to the soldering land 11U, 11V, 11W or 11C which is the connection target terminal on the circuit substrate 11. In this embodiment, the coupling portion is formed at a position close to the inner circumference of the core holder 131. The coupling portion is however not limited to this structure, and may be formed at a position close to the outer circumference or center of the core holder 131, if necessary. The depth of the coupling portion 133a is larger than the wire diameter of the coil 15, and should preferably be set to be larger than that by a small value, e.g., 0.1 to 0.2 mm.

The holding portion 133b is constituted by, for example, an open groove which has substantially the same width with the wire diameter of the coil 15 and is formed in the radial direction. The depth of the groove forming the holding portion 133b is larger than the wire diameter of the coil 15, and may preferably be set to be larger than that by a small value, e.g., 0.1 to 0.2 mm. Further, the dimension of a gap provided between the coil 15 held in the groove 133b and the bottom of the coupling portion 133a is determined to be zero or smaller than the wire diameter of the coil 15. The width of the groove forming the holding portion 133b is set to be substantially the same as the wire diameter of the coil 15. Here, the scope of the width is rather widely limited. More particularly, the width of the groove may be equal to, or slightly larger or smaller than the wire diameter of the coil 15, and formed so as to securely hold the wire or permit the wire to be easily thrust therein without releasing the winding start or final winding end of tile coil 15. In the coil 15, at least the tap 15a thereof, which is inserted in the coil wire end processing portion 133 and located in the coupling portion 133a, is a bare wire with its insulating cover or film peeled off therefrom. But, a part of the coil 15 inserted into the holding portion 133b may either be the bare wire or remain covered with the insulating covering. In addition, the tap 15a of the coil 15 arranged in the coupling portion 133a is cut so as to have a predetermined dimension, i.e., a sufficient length for being connected with the corresponding terminal portion such as the soldering land 11U, 11V, 11W or 11C on the circuit substrate 11. The corresponding terminal portion may be, for example, the conductive plate 11f shown in FIG. 27.

To the edges of the holding portion 133b from which the wire is inserted, there is provided a tapered inserting portion 133c as necessity requires, which is formed by enlarging the width of the groove. In this embodiment, the inserting portion 133c is formed to the coil end processing portion 133 in the sixth block on the outer periphery side of the core holder 131 as shown in FIG. 1, in order to facilitate insertion of the final winding end of coil from the outer periphery side to the inner periphery side of the core holder 131. However, when the coupling portion 133a provided on the inner side of the holding portion 133b functions as a guide, the inserting portion 133c is not formed to the coil end processing portion 133 in the first block where the winding start end of coil is pulled out from the inner periphery side to the outer periphery side of the core holder 131. Of course, it is also possible to form the inserting portion 133c on a boundary between the coupling portion 133a and the holding portion 133b, i.e., the inlet of the holding portion 133b positioned at the central part of the core holder 131.

Figure 7:
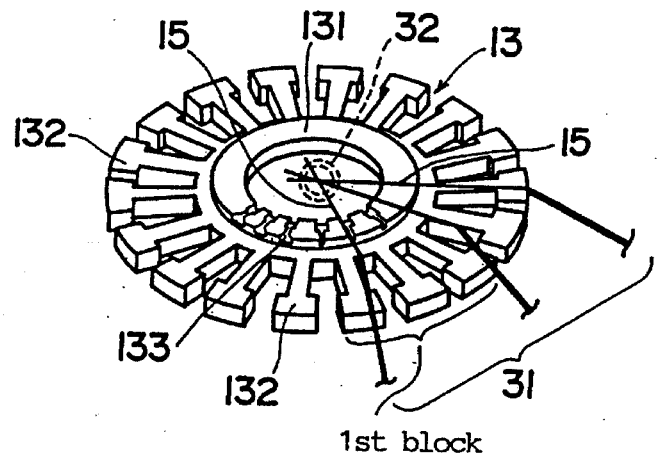
FIGS. 7 to 13 are perspective views for explaining the winding process.
Figure 8:
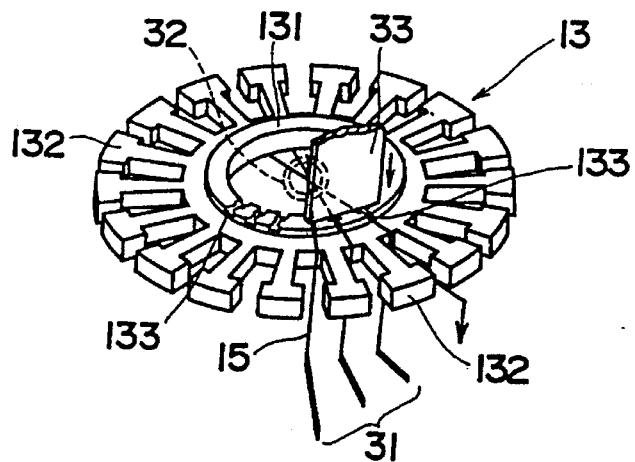

A description will now be given as to the procedure for winding the coil 15 around each salient pole of the stator core 13 constructed above. As shown in FIG. 7, the cross point of three wires of coils 15 in three phases, which are respectively extending from three coil nozzles 31, is firstly set in the center of the stator core 13. This cross point is then held by a gripper 32, and the three coil nozzles 31 are arranged above the three salient poles 132 in the first block of the stator core 13. Subsequently, the three coil nozzles 31 are lowered below the stator core 13, so that each of the wires is set in position upon the holding portion 133b of the coil end processing portion 133 in the core holder 131, as shown in FIG. 8. At this moment, the coupling portion 133a provided on the inner periphery side of the core holder 131, or the inserting portion 133c which may be formed if necessary, acts as a guide in the coil end processing portion 133 in the first block, and hence each of the wires being inclined downwardly relative to the gripper 32 is led into and automatically positioned in the holding portion 133b forming a groove. Thereafter, the edges of such groove are squashed by lowering a punch 33 onto the holding portion 133b while thrusting the wire into the same holding portion 133b, so that the wire is fixed in the coil end processing portion 133. The area designated by hatching in FIG. 1 is the part squashed by the punch 33.

Figure 9:
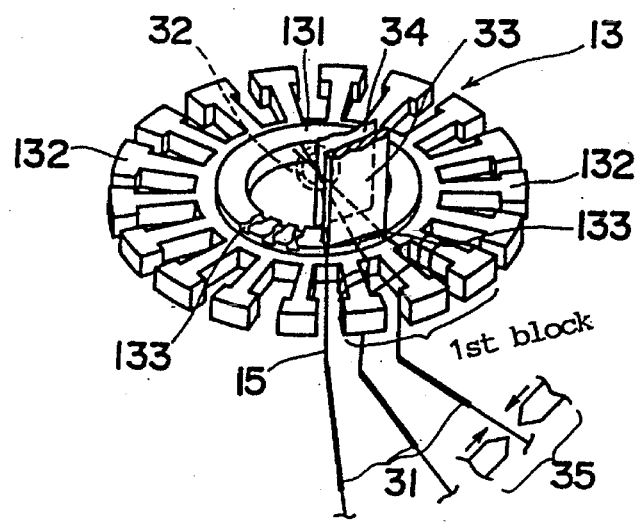

Next, the three coils 15 in the respective phases are formed in such a manner that the three wires are wound around the three salient poles 132 in the first block, with the end of each wire being held by the gripper 32 and the punch 33 being pushed against the holding portion 133b, as shown in FIG. 9. When completing the winding of wire around each salient pole 132 in the first block, a cutter 34 is lowered to cut the winding start ends of coils 15 in the same line, so that their ends are all projected at the same length appropriate for connection with the circuit substrate or the like. Thereafter, the punch 33 and cutter 34 are lifted. The tap 15a of the winding start end of coil 15 in the first block is accommodated in the coupling portion 133a while being fixed in the holding portion 133b in the coil end processing portion 133. Next, the three coil nozzles 31 are relatively moved from the vicinity of the three salient poles 132 in the first block toward the second block, and three coils 15 are formed by winding the wire around the three salient poles 132 in the second block. Here, the wire does not necessarily have to be held in the core holder 131. In such a manner, coils 15 in each phase are successively formed in the third to fifth blocks by repeating the above-described procedure.

As shown in FIG. 9, a covering peeling device 15 is provided at the rear of the coil nozzle 31. Although not shown, each of the wires is supplied from a bobbin of a winding machine toward each of the three nozzles 31. When the wire thus supplied reaches between the tap 15a of final winding end of coil in the sixth block and the opposite tap 15a of winding start end of coil in the next stator core 13, the covering in this area of the wires is peeled off by means of the covering peeling device 35. The peeling may be performed only to the two taps 15a respectively in the sixth block and the first block in another stator core 13, or to the entire area extending from the one tap 15 to another tap 15. Subsequently, the wires are wound around the three salient poles 132 in the sixth block.

Figure 10:
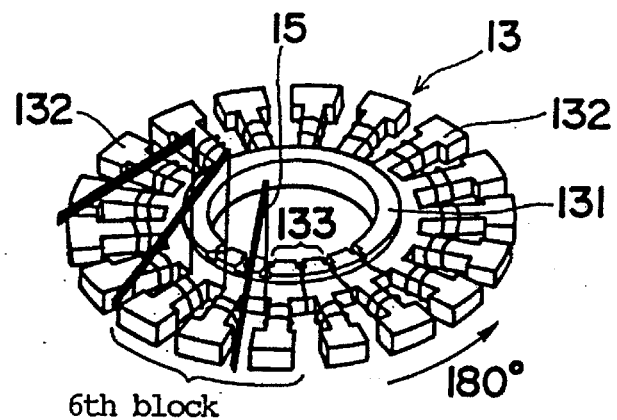
Figure 11:
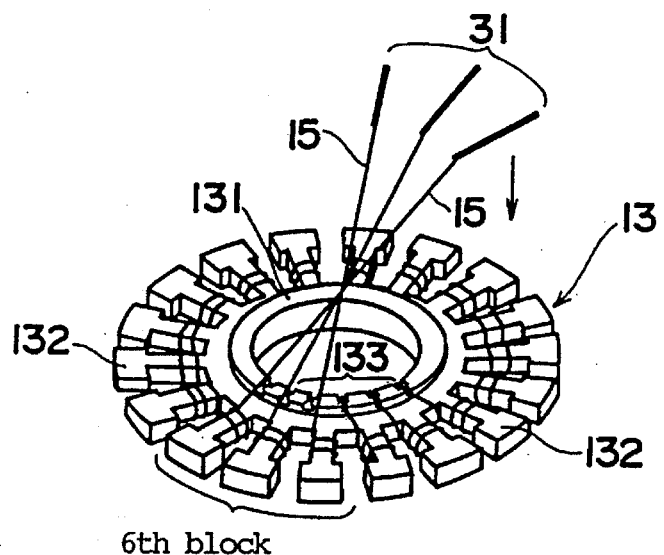
Figure 12:
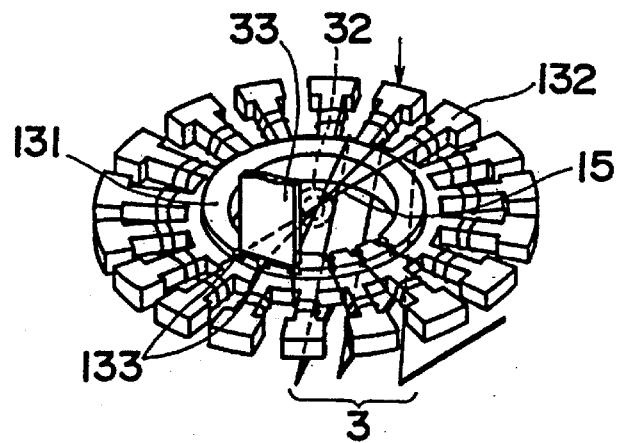

When the winding of wires around the respective three salient poles 132 has been completed in the sixth block, the three coil nozzles 31 are stationed above the stator core 13, as shown in FIG. 10. While keeping this state, the stator core 13 is rotated in the horizontal direction to obtain the state shown in FIG. 11. The three nozzles 31 are then moved below the stator core 13. As a result, the wires in the three phases radially cross one another, extending transversely of and above both stator core 13 and core holder 131, as shown in FIG. 12. At this point, those wires in the three phases are brought into contact with the inserting portions 133c provided on the outer periphery side of the coil end processing portions 133 in the six block, and guided by the inserting portions 133c so as to be led directly above the respective holding portions 133b. In this state, each wire is thrusted into the groove of the holding portion 133b by lowering the punch 33 thereon to squash the edges of the groove, as shown in FIG. 12, thereby fixing the wire in the groove.

Figure 13:
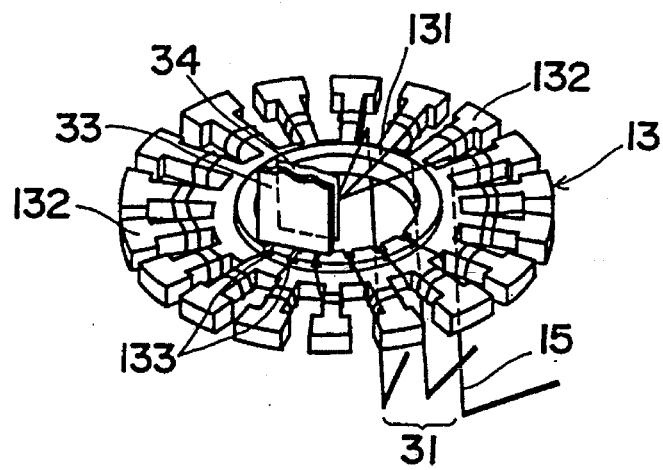
Figure 14:
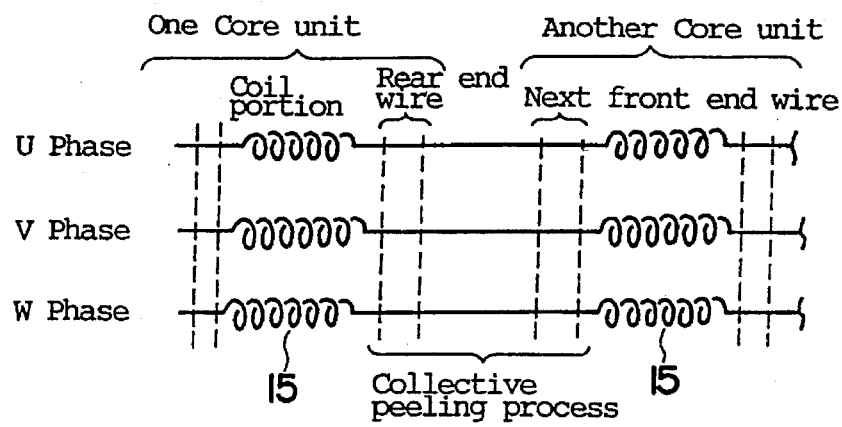
FIG. 14 is a circuit diagram showing the relationship of coupling of wires in the winding process illustrated in FIGS. 7 to 13.

Further, the cross point of the wires is held by the gripper 32 while keeping the punch 33 in the foregoing lowered state. Then, the cutter 34 is lowered to cut the wires in an appropriate length for connection with the circuit substrate 11 or the like, as shown in FIG. 13.

The above-described explanation is the winding procedure for the stator core 13. The coils in three phases, which are wound around respective salient poles of the stator core, is called "the core coil unit".

Figure 23:
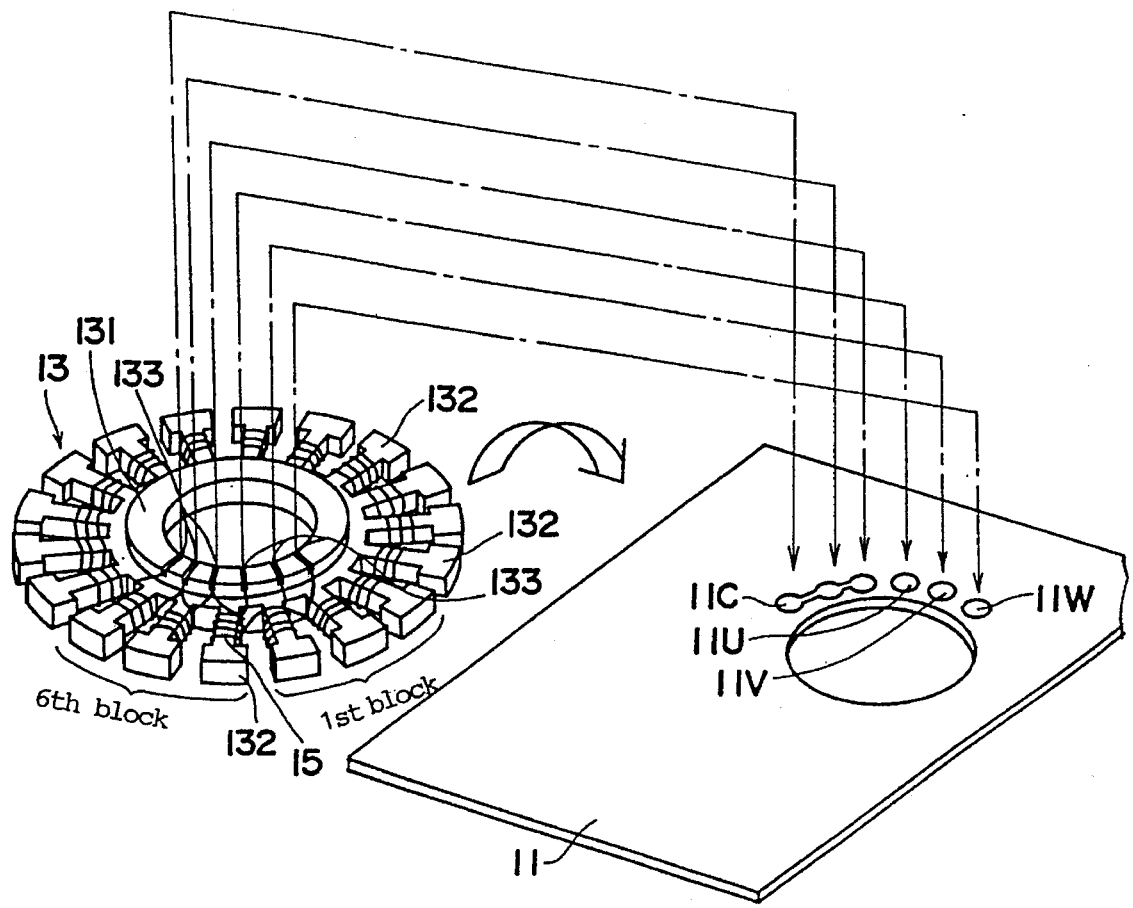
FIG. 23 is an exploded perspective view showing the relationship of the connection made between a core coil unit and a substrate.

The thus-obtained core coil unit is set on the circuit substrate 11, as shown in FIG. 23. The circuit substrate 11 has the soldering lands 11U, 11V, 11W and 11C. Since the coils 15 in the three phases have in common the soldering land 11C that has such a configuration that three-phase lands are electrically combined. On the other hand, the soldering lands 11U, 11V and 11W are provided at the respective positions corresponding to the coil end processing portions 133 in the first block of the core coil unit. The common soldering land 11C is arranged at a position corresponding to the coil end processing portions 133 in the six block. The taps 15a in the winding start or final winding end of the three coils 15, which are held by the holding portions 133b and exposed in the coupling portions 133a in the coil end processing portions 133, are soldered to the corresponding soldering lands 11U, 11V, 11W and 11C. The coupling portion 133a in coil end processing portion 133 is not restricted to the present embodiment but, in general, this position may be principally determined by the circuit configuration of the circuit substrate 11.

Figure 4:
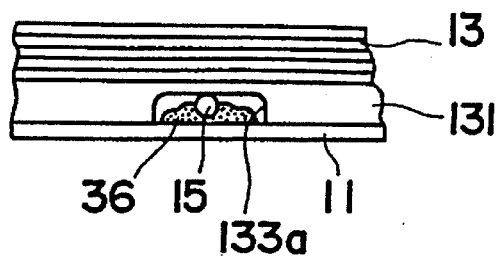
FIG. 4 is a partially enlarged side elevational view showing a coil end processing portion when the core coil unit is mounted on a circuit substrate.

The foregoing soldering steps are carried out as follows: Firstly, as shown in FIG. 4, the cream solder 36 is previously applied to each of the soldering lands 11U, 11V, 11W and 11C of the circuit substrate 11. Then, the soldering lands 11U, 11V, 11W and 11C are positioned to the respective coil end processing portions 133 in the first and sixth blocks. The core coil unit is mounted onto tile circuit substrate 11, and thereafter reflow soldering is carried out. Thus, the core coil unit and the circuit substrate 11 are electrically coupled, to thereby obtain the stator unit.

Figure 5:
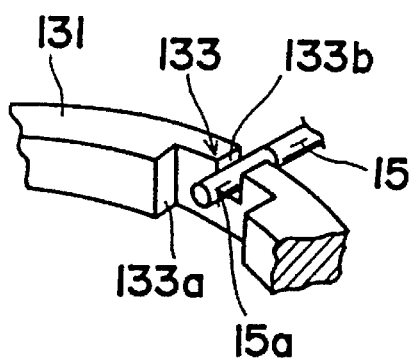
FIG. 5 is an enlarged perspective view showing the coil end processing portion constructed in accordance with a second embodiment of the present invention.
Figure 6:
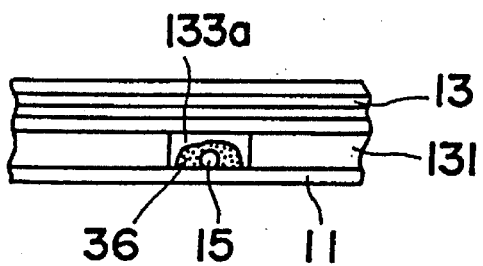
FIG. 6 is a side elevational view showing the coil end portion when the core coil unit is mounted on the circuit substrate, which is illustrated in FIG. 5.

FIGS. 5 and 6 show a second embodiment of the present invention. The second embodiment includes the coil end processing portion 133 consisting only of the coupling portion 133a and the holding means 13 which is constituted by an open groove. This coil end portion 133 does not have such inserting portion 133c as provided in the first embodiment above. The coupling portion 133a forms by an open-bottomed concave portion, and is provided on, e.g., the inner periphery side of the core holder 131. In such a configuration, the coils 15 may be coupled to the circuit substrate 11 as follows: The cream solder is previously applied to each of the soldering lands 11U, 11V, 11W and 11C to enable the same fellow soldering as in the embodiment shown in FIG. 1, or permit a soldering to be effected automatically or manually so as to apply the soldering iron onto the top of the core coil unit.

FIGS. 19 to 22 show a third embodiment according to the present invention. In this embodiment, a pair of opposedly facing partition portions 133d are disposed protruding in the circumferential direction such as to project towards each other within the coil end processing portion 133. Thus, two recessed portions 133a and 133h are defined by those partition portions 133d, which in turn partition the core holder 131, such that the recessed portions 133a,133h lie along the outer and inner circumferences of the core holder 131, respectively. The recessed portion 133a forms the coupling portion. At the bottom of the coupling portion 133a which is defined by the partition portion 133d, there are formed the holding portion 133b for holding the winding start or final winding end of the coil 15. The holding portion 133b may be formed into an open groove, for exmaple. It is formed in a radial direction relative to the core holder 131, penetrating the partition portion 133d in a direction from the coupling portion 133a toward the other coupling portion 133a. The partition portion 133d not only forms the coupling portion 133a, but also functions to position the conductive member 133f provided inside the coupling portion 133a and prevent the solder 36 from outflowing toward the outer periphery side of the core holder 131. Since the provision of the partition portion 133d defines the recessed portion 133h on the outer periphery side of the core holder 131, it is not necessary to make deeper the groove constituting the holding portion 133b. Further, the partition portion 133d functions as a positioning guide for introducing the wire of the coil 15 into the holding portion 133b. This function is more effective, particularly in the case that the edges formed between the partition portions 133d are cut off so as to provide a sloped surface in each of them.

In addition, formed in the holding portion 133b is a hole 133e perforated through the core holder 131 in a direction of the thickness thereof. This hole 133e allows insertion thereinto of an electrode 38 adapted for welding both coil 15 and plate-like conductive member 133f, the conductive member 133f being accommodated in the holding portion 133a. The hole 133e is opened at a position where there lies the tap 15a of the winding start or final winding end of the coil 15 connected with the soldering land 11U, 11V, 11W or 11C of the circuit substrate 11.

The above-described coupling portion 133a forms a space which is at least sufficiently large to receive the solder for use in connecting the winding start or final winding end of the coil with the circuit substrate 11. The depth of the holding portion 133b forming a groove is larger than the wire diameter of the coil 15, and may preferably be set to be as small as 0.1 to 0.2 mm. More particularly, the depth of the holding portion 133b is determined in such a manner that a gap smaller than the wire diameter of the coil 15 is formed between the tap 15a of the coil 15 fixed in the holding portion 133b and the bottom of the coupling portion 133a. The width of the holding portion 133b is substantially the same width (equal to or slightly larger or smaller as) the wire diameter of the coil 15, to the degree that the wire is substantially held by the holding portion without removal therefrom or held by the same thrust of the wire therein. The inserting portion 133c is formed by progressively enlarging the width of the groove at the edges of the holding portion 133b from which the wire of the coil 15 is inserted. In the case of such coil end processing portion 133, the bottom of the recessed portion 133h defined by the partition portion 133d from the coupling portion 133a, or in particular, the edges the holding portion 133b, which form the groove, are squashed as by a punch, so that the wire is embedded in the core holder 131. At the same time, the plate-like conductive member 133f is disposed at the coupling portion 133a on the inner periphery side such as to be superimposed on the wire of the coil 15 which is inserted in the holding portion 133b, thereby allowing the conductive member to be connected with the tap 15a of the coil 15 by welding or the like. It is noted here that at least the tap 15a of coil 15 is formed into a bare wire with its insulating covering or film peeled off.

Figure 20:
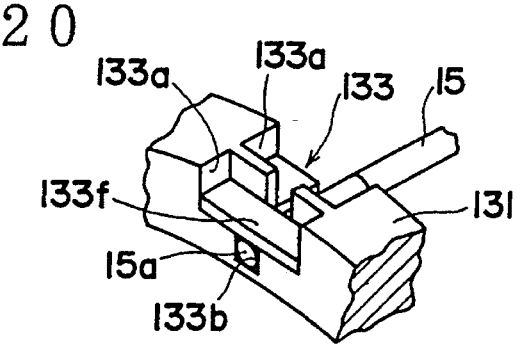
FIG. 20 is a perspective view showing the state in which an end of a coil is fixed in the coil end portion.
Figure 21:
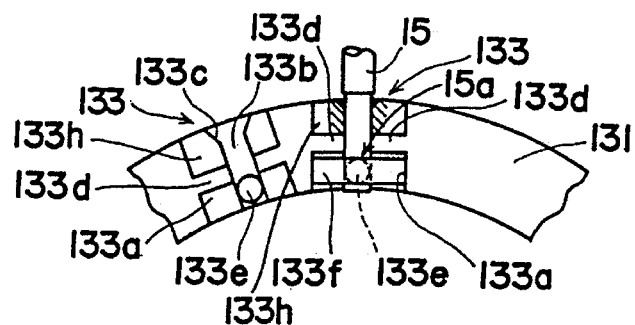
FIG. 21 is a plan view showing the state illustrated in FIG. 20.
Figure 22:
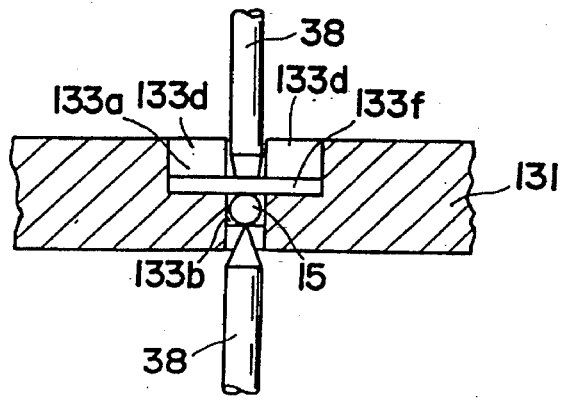
FIG. 22 is an elevational view showing an example of the coupling process in which an end of a coil is coupled to a conductive member in the coil end processing portion in the third embodiment.

The soldering of the wires in the respective coil end processing portions 133 to soldering lands 11U, 11V, 11W and 11C is carried out in the following manner. But, an explanation will be given only as to a wire end process for the coil 15. Now, at a start or an end of wire winding process, the winding start or final winding end of the coil 15 is to be fixed in the holding portion 133b, as indicated in FIGS. 20 and 21. Therefore, the plate-like conductive member 133f should be disposed in the coupling portion 133a to hold the tap 15a of the coil 15. Then, as shown in FIG. 22, one of electrodes 38 is brought into contact with the upper portion of the conductive member 133f, and another of electrodes 38 is inserted into the hole 13 formed in the core holder 131 so as to contact the tap 15a of the coil 15. Hence, with the conductive plate 133f and tap 15a of the coil 15 being sandwiched between the two electrodes 38, an electric current is applied between the electrodes 38, effecting a mechanical and electrical connection of both conductive plate 133f and the tap 15a through a welding, the so-called "fusing".

Figure 16:
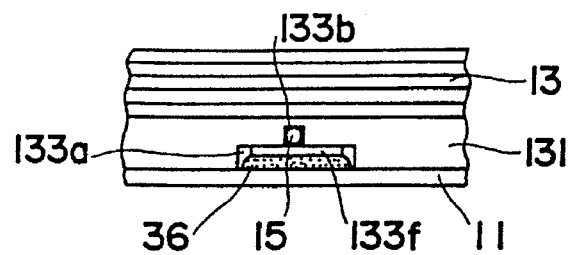
FIG. 16 is an elevational view showing the primary part of a stator for a rotating electric machine constructed in accordance with a third embodiment of the present invention.
Figure 17:
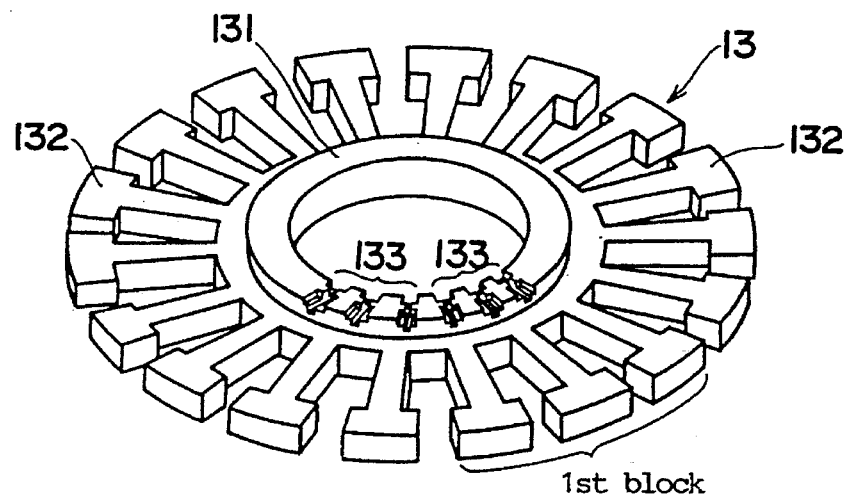
FIG. 17 is a perspective view showing the third embodiment of a stator core applied to the stator of the rotating electric machine according to the present invention.
Figure 18:
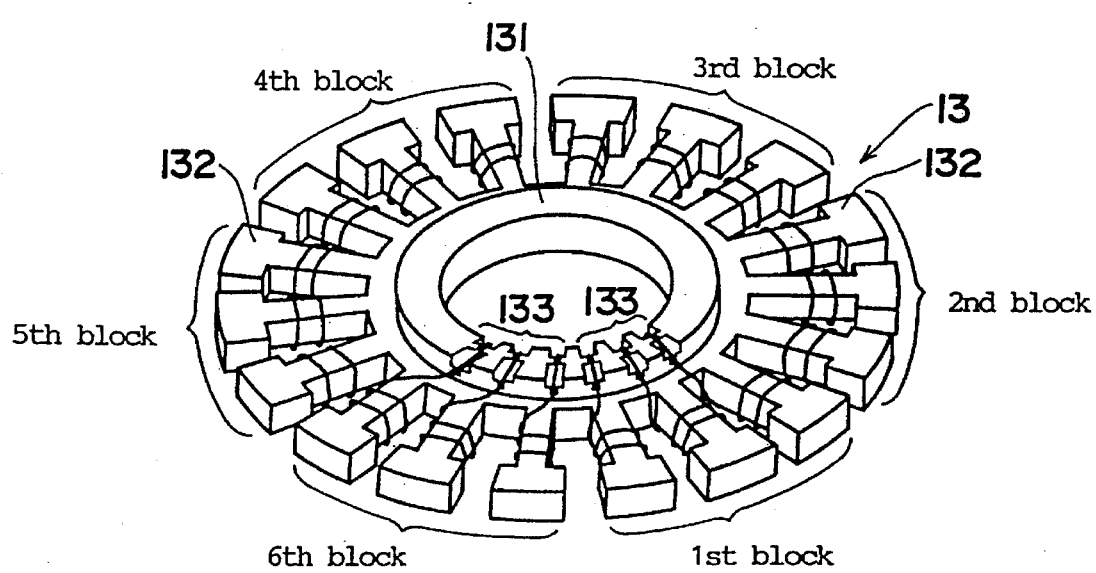
FIG. 18 is a perspective view showing the state in which windings are made to the stator core illustrated in FIG. 17.
Figure 19:
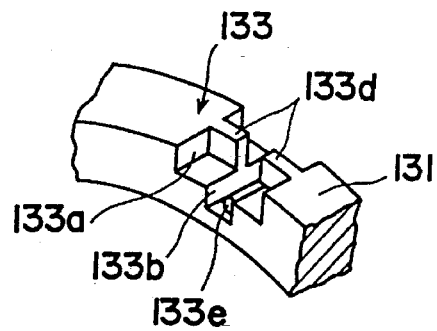
FIG. 19 is a perspective view showing the coil end in the third embodiment.

On the other hand, cream solder is previously applied to each of the soldering lands 11U, 11V, 11W and 11C of the circuit substrate 11 shown in FIG. 23, and the respective coil end processing portions 133 to be soldered therewith are positioned to the corresponding soldering lands 11U, 11V, 11W and 11C. Thereafter, the core coil unit is mounted on the circuit substrate 11, and then subject, together with the substrate 11, to a fellow soldering in a reflow furnace. FIG. 16 shows a resultant state of the coil end processing portion 133 after such soldering. The wire end of the coil 15 is previously coupled to the conductive plate 133f by the fusing and therefore connected to the soldering land 11U, 11V, 11W or 11C via the conductive plate 133f.

According to the third embodiment described above, after fixing the winding start and final winding end of the coils 15 to the conductive members 133f as by welding, the conductive members 133f are soldered to the soldering lands 11C, 11U, 11V and 11W of the circuit substrate 11 which increases the reliability of coupling among the soldering lands 11U, 11V, 11W and 11C and the taps 15a of the coils 15 and also realizes an accurate coupling. Moreover, even though the taps 15a may be roughly positioned to the soldering lands 11U, 11V, 11W, and 11C, such coupling will be reliably carried out. Also, it is possible to automate all the processes, namely, from the winding process wherein the winding start end and final winding ends of the coil 15 are held in the coil end processing portion 133, causing the coil 15 to be wound around each of the salient poles 132, by way of the coupling process for coupling the tap 15a of the coil 15 to the conductive member 133f, up to the last process wherein the conductive member 133f is connected to the soldering land 11C, 11U, 11V or 11W, thereby reducing the production cost.

Figure 24:
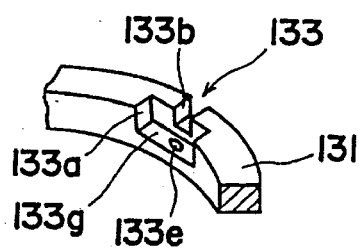
FIG. 24 is a perspective view showing the primary part of a fourth embodiment according to the present invention.
Figure 25:
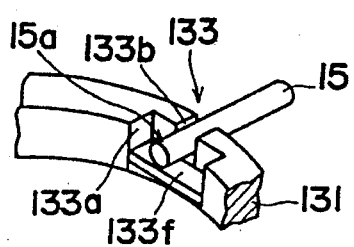
FIG. 25 is a perspective view showing the primary part of the state in which an end of a winding is inserted into a core holder.
Figure 26:
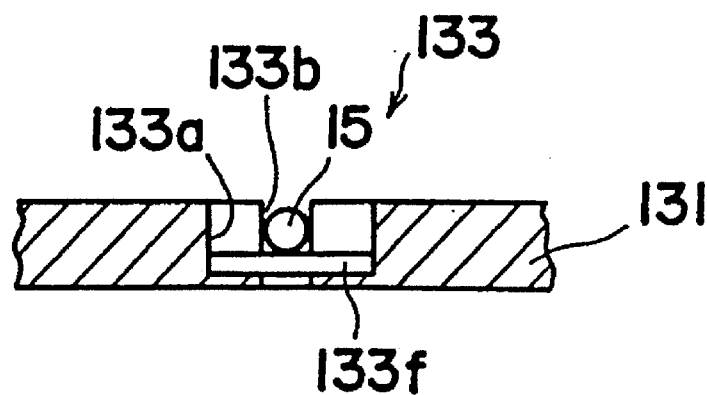
FIG. 26 is an elevational view the state illustrated in FIG. 25.

FIGS. 24 to 26 show a fourth embodiment according to the present invention. The coil end processing portion 133 of the core holder 131 in this fourth embodiment includes: a holding portion 133b which forms a groove extending in a radial direction relative to the core holder 131; a coupling portion 133a having a larger space than the holding portion 133b, through which coupling portion, the tap 15a of the coil 15 is exposed; and a hole 133e provided at the bottom 133g of the coupling portion 133a, penetrating the core holder 131 in the direction of its thickness from the holding portion 133b. A plate-like conductive member 133f is disposed at the bottom 133g of the coupling portion 133a in such a manner that the upper surface of the conductive member 133f becomes parallel with the bottom of the holding portion 133b.

In the case of a coil end processing portion 133 that has such configuration as shown in FIGS. 24 and 25, the wire end of coil 15 should be held in that portion 133 under the same procedure with that in the third embodiment. Specifically, after the wire end of the coil 15 is inserted into the holding portion 133b, the edges of the groove of the holding portion 133b are squashed by using a punch or the like to thereby fix the wire end of the coil 15. Subsequently, one of the electrodes 38 is pressed against the tap 15a of the coil 15, while another of electrodes 38 is inserted through the hole 133e to contact the conductive member 133f. An electric current is then applied between both electrodes 38, so that the tap 15a of the coil 15 is electrically connected with the conductive member 133f by fusing. FIG. 26 shows this connecting state. Further, the coil end processing portions 133 are respectively positioned on the predetermined soldering lands 11U, 11V, 11W and 11C of the substrate, and wire ends of the coils 15 together with the conductive members 133f are respectively soldered to soldering lands 11U, 11V, 11W and 11C by a reflow soldering. In this regard, the core holder 131 is overturned from the state shown in FIG. 26 and mounted on the circuit substrate 11, after which, the coil end processing portions 133 are positioned at their corresponding soldering lands 11U, 11V, 11W and 11C, respectively, to carry out the reflow soldering. Consequently, the tap 15a of the coil 15 is covered with reflow solder 36, while simultaneouly the conductive members 133f and soldering lands 11U, 11V, 11W or 11C are connected with one another by the reflow solder 36. The winding of the coil 15 around the respective salient poles 132 in the stator core 13 is not limited to the uniform winding, and any other winding method may be employed.

Although the invention has been described with reference to preferred embodiments, this description is not meant to be construed in a limiting sense. Various modifications of the disclosed embodiments may be made without departing from the gist of the invention. For example, each of the stator cores in the first to fourth embodiments is so configured as to have 18 poles and three phases, but the number of poles and phases may be arbitrarily determined.

Figure 27:
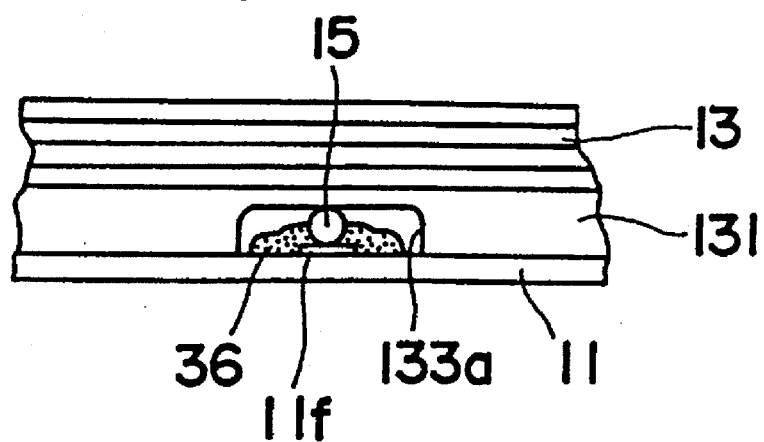
FIG. 27 is an elevational view showing another structure of the terminal portion.
Figure 28:
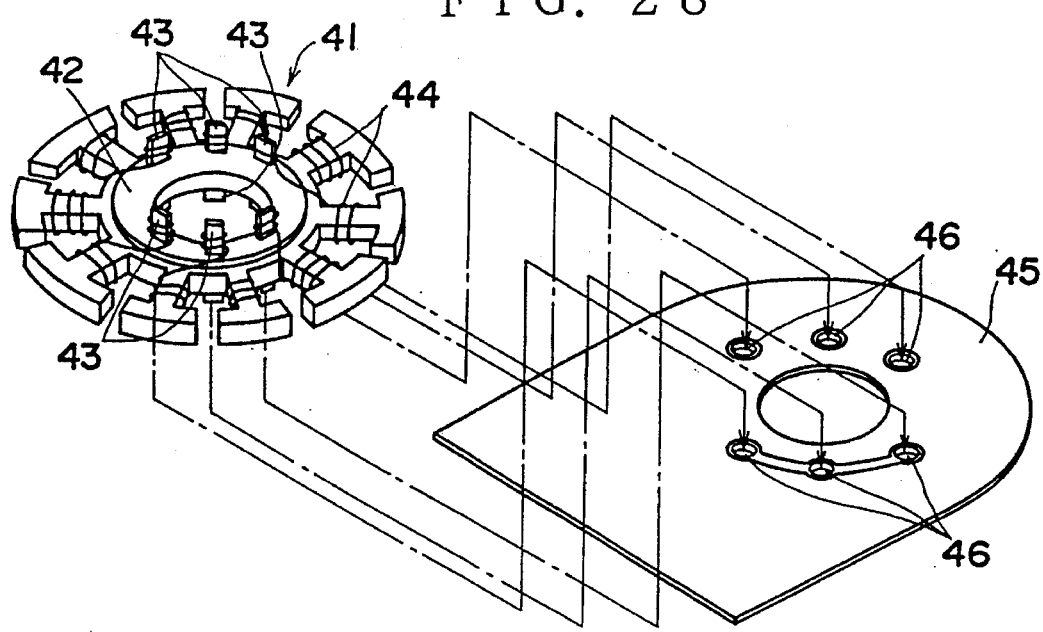
FIG. 28 is an exploded perspective view showing a stator unit of a prior art rotating electric machine.
Figure 29:
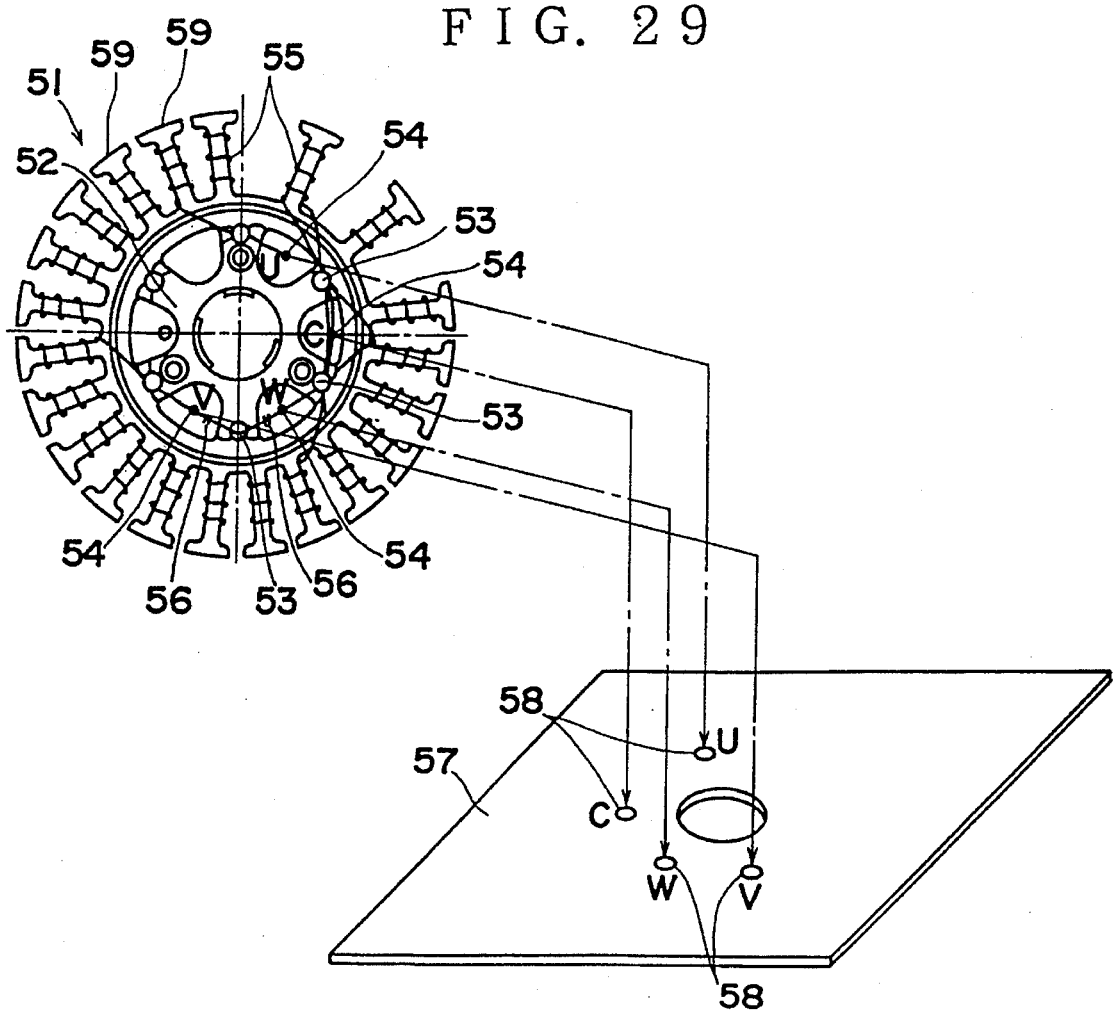
FIG. 29 is an exploded perspective view showing another example of the stator unit of a prior art rotating electric machine.

In addition, as shown in FIG. 27, the conductive plate 11f of phosphor bronze, copper or others may be previously fixed to each of the soldering lands 11U, 11V, 11W and 11C, so that the tap 15a of the coil 15 may be soldered to that conductive member 11f, using the solder 36. Of course, a lead frame, instead of the plate-like conductive member 11f, may be disposed on the circuit substrate 11 in advance, in which case, as the conductive member 11f has been provided on the circuit substrate 11, the coil end processing portions 133 can be roughly positioned to the soldering lands 11U, 11V, 11W and 11C, respectively, in a similar manner as in the embodiments illustrated in the FIGS. 19 to 23.

Further, the holding portion 133b and the coupling portion 133a are not restricted to those in the above embodiments, but may be modified insofar as the coil end processing portion 133 formed in the core holder 131 is of a shape providing a space which permits the end wire of the coil 15 to be held therein and soldered to the soldering land 11U, 11V, 11W or 11C of the circuit substrate 11 directly or through the plate-like conductive member.

Furthermore, the shape of the stator core 13 is not limited to those of the illustrated embodiments. Although not shown, the stator core may have salient poles projecting in a direction of normal toward the center of the inner ring portion.

What is claimed is:

1. A stator of a rotating electric machine comprising: a stator core having a plurality of salient poles radially protruding from a ring portion thereof; a core holder having an insulating property, which is assembled into the ring portion of said stator core; and a coil wound around each of said salient poles; said core holder being formed with coil end processing portions on a plane facing oppositely towards a plane of a circuit substrate on which there is formed a land portion for mounting said core holder thereon; each of said coil processing portions including: a holding portion for holding a winding start end or a final winding end of said coil, and a coupling portion having a larger width than that of said holding portion, wherein said coupling portion has exposed a part of said winding start end or final winding end of said coil, with which part is to be connected said land portion associated with said circuit substrate, wherein said coupling portion is also for surrounding said part of said winding start or final winding end in such a manner as to form a plane of said coupling portion facing oppositely towards said land portion of said circuit substrate, with said coil therebetween, and wherein said coupling portion further forms a recessed portion which is sufficiently large to accommodate a predetermined amount of solder previously supplied to said land portion of said circuit substrate and to permit for soldering, therewithin, said winding start and final winding ends to said land portion of said circuit substrate, and wherein said plane of said coupling portion faring oppositely towards said land portions of said circuit substrate has a part to be soldered to said land portion of said circuit substrate, the reverse side of which is brought into contact with said coil.

2. A stator of a rotating electric machine as defined in claim 1, wherein said holding portion has substantially as wide as a wire diameter of said coil, and includes a groove having a larger depth than the wire diameter of said coil.

3. A stator of a rotating electric machine as defined in claim 1, wherein said coupling portion has a depth which is larger than a wire diameter of said coil.

4. A stator of a rotating electric machine as defined in claim 1, wherein an inserting portion having a larger width than a wire diameter of said coil is formed on a side of said holding portion from which said wire is inserted.

5. A stator of a rotating electric machine as defined in claim 1, wherein a conductive plate is previously fixed to said land portion of said circuit substrate.

6. A stator of a rotating electric machine as defined in claim 1, wherein said core holder is assembled in a central portion of said stator core.

7. A stator of a rotating electric machine comprising: a stator core having a plurality of salient poles radially protruding from a ring portion thereof; a core holder having an insulating property, which is assembled into the ring portion of said stator core; and a coil wound around each of said salient poles; said core holder being formed with coil end processing portions on a plane facing oppositely towards a plane of a circuit substrate on which there is formed a land portion for mounting said core holder thereon; each of said coil processing portions including: a holding portion for holding a winding start end or a final winding end of said coil, and a coupling portion having a larger width than that of said holding portion, wherein said coupling portion has exposed a part of said winding start end or final winding end of said coil, with which part is to be connected said land portion associated with said circuit substrate, wherein said coupling portion is also for surrounding said part of said winding start or final winding end in such a manner as to form a plane of said coupling portion facing oppositely towards said land portion of said circuit substrate, with said coil therebetween, and wherein said coupling portion further forms a recessed portion which is sufficiently large to accommodate a predetermined amount of solder previously supplied to said land portion of said circuit substrate and to permit for soldering, therewithin, said winding start and final winding ends to said land portion of said circuit substrate, wherein a conductive member is arranged in said coupling portion, said conductive member being to be electrically connected in advance to a part of said winding start end and final winding end of said coil which is soldered to a corresponding terminal portion and, through said conductive member, said winding start and final winding ends of said coil are electrically connected to said corresponding terminal portion and wherein said holding portion has, formed therein, partition portions for positioning said conductive member within said coupling portion.

8. A stator of a rotating electric machine as defined in claim 7, wherein said conductive member is of a plate type.

* * * * *